United States Patent

Camp et al.

[15] 3,668,872

[45] June 13, 1972

[54] SOLID PROPELLANT ROCKET

[72] Inventors: Albert T. Camp, Indian Head; Alan McCone, Jr., Hyattsville, both of Md.

[22] Filed: Jan. 30, 1967

[21] Appl. No.: 614,525

[52] U.S. Cl. .................................60/207, 60/219, 60/220, 60/251, 60/253, 239/127.3, 239/265.15
[51] Int. Cl. .........................................C06d 5/00, F23r 1/00
[58] Field of Search .................60/204, 207, 220, 231, 253; 239/127.1, 127.3, 263.15, 263.17

[56] References Cited

UNITED STATES PATENTS

| 2,444,957 | 7/1948 | Skinner | 60/253 |
| 3,083,527 | 4/1963 | Fox | 60/207 |
| 3,133,413 | 5/1964 | Lawrence | 60/224 |
| 3,158,061 | 11/1964 | Lager | 60/250 |
| 3,176,618 | 4/1965 | Forsberg et al. | 60/253 |
| 3,292,376 | 12/1966 | Ernst et al. | 239/265.17 |
| 3,304,722 | 2/1967 | Culpepper | 60/271 |

*Primary Examiner*—Samuel Feinberg
*Attorney*—R. S. Sciascia and J. A. Cooke

[57] ABSTRACT

A method and apparatus for utilizing the volatility of the combustion products of solid metallic propellants to accelerate metal combustion products to gaseous velocity by recondensing the gaseous products in the rocket envelope behind the throat of the nozzle. A further useful effect is accomplished by the reaction between the steam formed in the condensation reaction and an added fuel to form additional moles of working gas.

15 Claims, 1 Drawing Figure

PATENTED JUN 13 1972　　　　　　　　　　　3,668,872
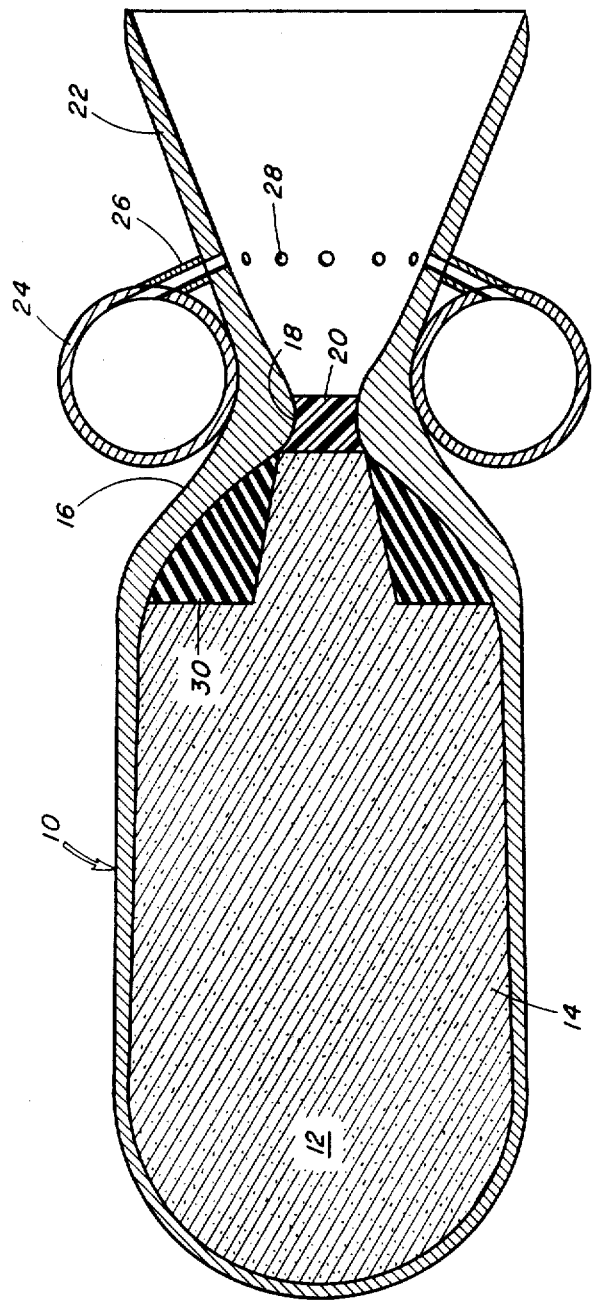
INVENTORS
Albert T. Camp
Alan McCone, Jr.

3,668,872

SOLID PROPELLANT ROCKET

BACKGROUND OF THE INVENTION

The invention described herein may be manufactured and used by or for the Government of the United States of America for governmental purposes without the payment of any royalties thereon or therefor.

This invention relates to solid propellant rockets and more particularly a method and apparatus for using fuels containing a light metal such as beryllium, boron, aluminum, magnesium, zirconium, titanium, lithium, silicon, aluminum borohydride and the hydrides of the metals in solid propellant rocket motors.

Heretofore, fuels such as beryllium, boron, aluminum, magnesium, zirconium, titanium, lithium, silicon, aluminum borohydride and the hydrides of the metals have not found effective practical application in solid propellant rockets due mainly to inefficiencies in combustion. Theoretically, these metals and hydrides offer very substantial gains in specific impulse of propellants. All the metals form hydroxides which are volatile at temperatures encountered in rocket propellant combustion. But advantage of this volatility has not been taken to accelerate the metal combustion products to gaseous velocity prior to their condensation within the rocket nozzle expansion cone to thereby improve specific impulse.

All accepted thermochemical data to the contrary, recent rocket evaluations of certain beryllium modified solid propellants have shown that gaseous species of oxidized beryllium are formed in significant proportions during the combustion or expansion process. The most likely gaseous species are H—O—Be—O—H, H—O—Be—Cl, $BeCl_2$ and BeOH. The important members of these species form and persist at rather high temperatures, as they are less easily dissociated than steam, and remain gaseous until cooled to about 1,200° C. Such a low temperature is not ordinarily reached in a rocket nozzle expansion cone; thus, except at extremely high expansion ratios, one or more gaseous beryllium compounds would normally leave the expansion cone as a gas containing substantial latent heat of vaporization. This phenomenom helps explain the consistent loss of specific impulse efficiency encountered with beryllium propellants at intermediate expansion ratios of 25 to 1 to 50 to 1.

SUMMARY OF THE INVENTION

It is an object of this invention to provide a solid propellant rocket apparatus and method of using fuels containing a light metal such as beryllium, boron and aluminum magnesium, zirconium, titanium, lithium, silicon, aluminum borohydride and the hydrides of the metals, wherein the gaseous species of the oxidized metal formed during the combusion or expansion process is cooled sufficiently to extract the latent heat of vaporization and thus increase the specific impulse efficiency.

The above and other objects are generally accomplished in a solid propellant rocket motor by cooling the products of combustion of the metal downstream of the throat of the expansion nozzle by injecting a pressurized gaseous fuel. The gaseous fuel injected into the rocket nozzle mixes efficiently with the rocket combustion products to provide additional moles of gas for thrust augmentation and any desired thrust vector control effect as needed. Additionally the gaseous products of combustion are first cooled before reaching the throat of the expansion nozzle by passing through a ring of ablative material to thus initiate cooling to insure that the cooling process in the expansion nozzle is sufficient to remove the latent heat of vaporization of the gaseous combustion products.

BRIEF DESCRIPTION OF THE DRAWINGS

A more complete appreciation of this invention and many of its attendant advantages will be readily apparent as the same becomes better understood by reference to the following detailed description when considered in conjuction with the accompanying drawing wherein the single FIGURE is a sectional view of the rocket motor of the instant invention.

DESCRIPTION OF THE PREFERRED EMBODIMENT

Referring to the drawing, there is shown generally a rocket motor casing 10 enclosing a pressure chamber 12 having a highly oxidized solid propellant 14 containing a powdered light fuel such as beryllium, boron, aluminum, magnesium, zirconium, titanium, lithium, silicon, aluminum borohydride and the hydrides of these metals therein. The solid propellant can contain as major constituents a suitable polymeric binder selected from the group consisting of plasticized double-based nitrocellulose, polybutadiene, polyurethane, polysulfide-hydrocarbon, polyisobutylene and polyvinylchloride and at least one oxidizer from the group consisting of ammonium perchlorate, potassium perchlorate hydroxylammonium perchlorate, nitronium perchlorate, hydrazinium diperchlorate, hydrazinium nitroformate, cyclotetramethylene tetranitramine and cyclotrimethylene trinitramine.

The rocket casing 10 at its rear portion 16 forms a suitable indented nozzle throat portion 18 that is sealed initially by a suitable igniter and frangible nozzle plug 20. The casing 10 immediately after the throat portion 18 flares radially outward to form a conventional nozzle expansion envelope or cone 22 wherein the gaseous products of combustion may expand and accelerate.

A toroidal tank 24 is arranged externally of the nozzle throat area 18 having connecting passages 26 communicating with the expansion envelope 22 of the rocket through inlet ports 28 arranged circumferentially in the wall of the expansion envelope. The pressurized tank 24 contains a fuel selected from the group consisting of the alkanes such as methane, ethane, propane, butane, heptane and dodecane, the alkenes such as ethylene and propylene, an alkyne such as acetylene, methyl acetylene, ammonia, aniline, ethylamine, methylamine, ethylene diamine, o-toluidine, triethyl amine, hydrazine, unsymmetrical dimethyl hydrazine, monomethylhydrazine, dimethylenetriamine, furfuryl alcohol, ethyl alcohol, butylene, butadiene, or mixtures thereof and suspensions of carbon in any of the above. The fuel from tank 24 is injected into the expansion nozzle 22 so as to mix effectively with the rocket combustion products thereby reacting with them and cooling them to provide additional moles of gas for thrust augmentation and any desired thrust vector control effect as needed.

A cast ring 30 composed of a fuel rich material comprising 30–50 percent synthetic rubber compound rich in hydrocarbons selected from the group consisting of polybutadiene, polyurethane, polysulfide-hydrocarbon, polyisobutylene, polyvinylchloride, polyethylene, polypropylene and polyisoprene, 10–30 percent carbon black and 15–40 percent of a nitroamine, such as 1, 3, 5, 7 tetranitro - 1, 3, 5, 7 tetrazacycloctane (HMX) or 1, 3, 5 trinitro - 1, 3, 5 triazacyclohexane (RDX) is internally situated just in front of the throat 18 of the nozzle. The hot gases of the combustion products pass through the cast ring 30 and are partially cooled but not condensed before they reach the throat 18 of the nozzle. The cast ring ablates away to take away heat and reacts with the hot gases of combustion.

To illustrate the general operation of the rocket system, a solid propellant having powdered beryllium will be described with the understanding that any of the other light metals and hydrides would work similarly. Initially, the igniter 20 is actuated to begin the combustion process of the solid propellant fuel containing the powdered beryllium. The highly oxidized propellant has a combustion temperature of about 3,000° to 4,000° C. Among the products of combustion of the solid propellant are beryllium dihydroxide and possibly BeOH and BeOHCl in gaseous form and in molten globular form and $H_2O$ gas. At combustion temperatures the BeO and steam react to form gaseous $Be(OH)_2$. This gaseous beryllium dihydroxide is less easily dissociated than steam and persists at rather high temperatures and remains gaseous until about 1,200° C. Such a low temperature is not ordinarily reached within a nozzle expansion cone and thus except at extremely high expansion ratios, not normally achievable within the space limitations feasible for high altitude rockets, one or more gaseous beryllium compounds would normally leave the expansion cone as a gas containing substantial latent heat of vaporization. If the gaseous beryllium dihydroxide can be cooled to a range of 900° to 1,500° C the reaction proceeds to form solid BeO crystals in a particle size of 0.01 to 0.5 micron size and steam. By this added reactive step the most efficient utilization of the combustion of the powdered beryllium is accomplished as the latent heat of vaporization is recovered in the expansion nozzle. Impulse efficiencies of 98 percent are thereby obtainable in contrast with only 93 percent efficiencies obtained when the metal oxides remain always in the condensed state throughout combustion.

To achieve the necessary cooling to obtain the desired recondensation within the rocket envelope and the resultant finely divided condensed species it is necessary to cool the combustion gases as the necessary high expansion ratios are practically unachievable within size limitations that are essential. A first stage of cooling prior to the combustion gases reaching the throat area of the nozzle is obtained by allowing the hot gases to pass through the cast ring 30 which then ablates away and by endothermic reaction causes a partial cooling but not condensation. Further cooling may be effected in the expansion cone by the injection of the pressurized fuel from toroidal tank 24 to bring the exhaust temperature down to 1,200° C thereby to effectuate complete condensation. Additionally, the injected fuel reacts with the steam to provide additional moles of working gas, for example if methane is used the reaction would be $H_2O + CH_4 \rightarrow 3H_2 + CO$, and thus two moles of reactant would provide 4 moles of working gas.

Thus it can be seen that by allowing the metallicoxide gas to condense sufficiently to give up its latent heat of vaporization and to form submicron size crystal particles to allow complete utilization of all heat, impulse efficiency can be maximized.

Obviously numerous modifications and variations of the invention are possible in the light of the above teachings. It is therefore to be understood that within the scope of the appended claims the invention may be practiced otherwise than as specifically described herein.

We claim:

1. In a solid rocket propulsion motor, a rocket casing comprising,
   a pressure chamber containing an oxidizer, polymeric binder, and a powdered light fuel,
   means for initiating combustion of the contents of said chamber,
   said pressure chamber terminating at one end in an indented nozzle throat,
   said nozzle throat flaring radially outward to form a nozzle expansion cone,
   means communicating with said nozzle expansion cone to cool the gaseous products of combustion after said gaseous products of combustion have passed said nozzle throat comprising a toroidal tank positioned exterior to said rocket casing,
   connecting passages from said toroidal tank to said nozzle expansion cone,
   inlet ports in the walls of said nozzle expansion cone,
   said connecting passages communicating with said inlet ports to provide communication between said toroidal tank and said nozzle expansion cone, wherein said toroidal tank contains a pressurized fuel selected from the group consisting of alkanes, alkenes, and alkynes.

2. The rocket motor of claim 1 wherein the oxidizer is selected from the group consisting of ammonium perchlorate, potassium perchlorate, hydroxylammonium perchlorate, nitronium perchlorate, hydrazinium diperchlorate, hydrazinium nitroformate, cyclotetramethylene tetranitramine and cyclotrimethylene trinitramine.

3. The rocket motor of claim 1 wherein the polymeric binder is selected from the group consisting of plasticized double-based nitrocellulose, polybutadiene, polyurethane, polysulfide-hydrocarbon, polyisobutylene and polyvinylchloride.

4. The rocket motor of claim 1 wherein the powdered light fuel is selected from the group consisting of beryllium, boron, aluminum, magnesium, zirconium, titanium, lithium, silicon, aluminum borohydride and the hydrides of the metals.

5. The rocket system of claim 1 wherein the powdered light fuel is beryllium.

6. The rocket motor of claim 1 wherein the alkanes are selected from the group consisting of methane, ethane, butane, propane, heptane and dodecane, the alkenes are selected from the group consisting of ethylene and propylene and the alkyne is acetylene.

7. The rocket motor of claim 6 wherein said pressurized fuel contains fine suspensions of carbon.

8. The rocket motor of claim 1 including means within said pressure chamber adjacent said throat for initially partially cooling the gaseous products of combustion prior to their passage through the throat.

9. The rocket motor of claim 8 wherein said means for initially partially cooling the gaseous products of combustion includes a cast ring comprising 30–50 percent synthetic rubber compound rich in hydrocarbons, 10–30 percent carbon black and 15–40 percent nitroamine that reacts with the hot products of combustion and provides an endothermic reaction to remove heat.

10. The rocket motor of claim 9 wherein the synthetic rubber compound is selected from the group consisting of polybutadiene, polyurethane, polysulfide-hydrocarbon, polyisobutylene, polyvinylchloride, polyethylene, polypropylene and polyisoprene and the nitroamine is selected from the group consisting of 1,3,5,7 tetranitro-1,3,5,7 tetrazacycloctane and 1,3,5 trinitro-1,3,5 triazacylcohexane.

11. A process for achieving high specific impulse in a solid propellant rocket motor, comprising
    combusting a solid propellant containing an oxidizer, polymeric binder and a powdered light fuel selected from the group consisting of beryllium, boron, aluminum, magnesium, zirconium, titanium, lithium, silicon, aluminum borohydride and the hydrides of the metals, to form as part of the products of combustion a mixture of steam and the oxide of the light metal,
    allowing said mixture to react at combustion temperatures to form the metal hydroxide gas, and
    cooling said metal hydroxide gas to a temperature sufficient to release the latent heat of vaporization of said metal hydroxide gas and form metal oxide crystals in a particle size of 0.01 to 0.5 microns and steam, said cooling being accomplished by injecting a pressurized fuel, selected from the group consisting of alkanes, alkenes, and alkynes, and mixtures thereof, into the metal hydroxide gas while it is expanding.

12. The process of claim 11 wherein said combustion temperature is in the range of 3,000° to 4,000° C and said cooled temperature is in the range of 900° to 1,500° C.

13. The process of claim 11 wherein the alkanes are selected from the group consisting of methane, ethane, butane, propane, heptane and dodecane, the alkenes are selected from the group consisting of ethylene and propylene and the alkylene is acetylene.

14. The process of claim 11 wherein said cooling step is initiated by first passing said products of combustion through a cast ring comprising 30–50 percent synthetic rubber compound rich in hydrocarbons, 10–30 percent carbon black and 15–40 percent nitroamine to react with said products of combustion endothermically to remove heat from said products of combustion prior to expansion.

15. The process of claim 14 wherein the synthetic rubber compound is selected from the group consisting of polybutadiene, polyurethane, polysulfide-hydrocarbon, polyisobutylene, polyvinylchloride, polyethylene, polypropylene and polyisoprene and the nitroamine is selected from the group consisting of 1,3,5,7 tetranitro-1,3,5,7 tetrazacycloctane and 1,3,5 trinitro-1,3,5 triazacyclohexane.

* * * * *